United States Patent
Deshpande et al.

(10) Patent No.: US 12,476,897 B2
(45) Date of Patent: Nov. 18, 2025

(54) CONSTRAINED SHORTEST PATH FIRST PATH COMPUTATION FOR UNORDERED LIST OF INCLUDED INTERFACES

(71) Applicant: Ciena Corporation, Hanover, MD (US)

(72) Inventors: Peeyush Deshpande, Pune (IN); Todd Defilippi, Redwood City, CA (US); Roopesh Palasdeokar, Pune (IN)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 18/663,147

(22) Filed: May 14, 2024

(65) Prior Publication Data

US 2025/0310238 A1    Oct. 2, 2025

(30) Foreign Application Priority Data

Apr. 1, 2024  (IN) .............................. 202411027083

(51) Int. Cl.
| | |
|---|---|
| *G06F 13/00* | (2006.01) |
| *H04L 45/12* | (2022.01) |
| *H04L 45/122* | (2022.01) |
| *H04L 45/24* | (2022.01) |

(52) U.S. Cl.
CPC .......... *H04L 45/122* (2013.01); *H04L 45/123* (2013.01); *H04L 45/24* (2013.01)

(58) Field of Classification Search
CPC ...... H04L 45/122; H04L 45/123; H04L 45/24
USPC ................................................ 709/238, 239
See application file for complete search history.

(56) References Cited

U.S. PATENT DOCUMENTS

| | | | | |
|---|---|---|---|---|
| 7,016,307 | B2* | 3/2006 | Vasudev ................. | H04W 4/20 370/254 |
| 8,422,502 | B1* | 4/2013 | Alaettinoglu ........... | H04L 45/38 370/395.3 |
| 8,885,461 | B2* | 11/2014 | Kini ........................ | H04L 45/22 370/228 |
| 9,026,674 | B1* | 5/2015 | Kanna .................... | H04L 43/062 709/239 |
| 9,338,082 | B2* | 5/2016 | Liu ........................ | H04L 45/125 |
| 11,575,596 | B1* | 2/2023 | Lohani .................. | H04L 43/062 |
| 11,757,757 | B2* | 9/2023 | Alaettinoglu ........... | H04L 45/42 709/238 |
| 12,081,431 | B1* | 9/2024 | Agrawal ............. | H04L 12/4641 |

(Continued)

*Primary Examiner* — Kenneth R Coulter
(74) *Attorney, Agent, or Firm* — Baratta Law PLLC; Lawrence A. Baratta, Jr.

(57) ABSTRACT

A Constrained Shortest Path First (CSPF) path computation for an unordered list of included interfaces includes receiving a request for a shortest path in a network from a source to a destination; determining all possible path combinations between the source, the list of interfaces, and the destination, where each of the possible path combinations includes a plurality of sub-paths stitched together to form an end-to-end path between the source and the destination; for each of the possible path combinations, determining an end-to-end path from the source to the destination based on (1) utilizing an already computed sub-path if available, (2) computing a sub-path if it has not been computed yet and storing a result for re-use, and (3) rejecting a possible path combination based on one or more criteria; and responding to the request with a shortest path of all of the possible path combinations based on the metric.

20 Claims, 3 Drawing Sheets

(56) References Cited

U.S. PATENT DOCUMENTS

| | | | |
|---|---|---|---|
| 2005/0201290 A1* | 9/2005 | Vasudev | H04W 4/20 370/238 |
| 2013/0010589 A1* | 1/2013 | Kini | H04L 45/22 370/219 |
| 2014/0185531 A1* | 7/2014 | Liu | H04L 45/125 370/329 |
| 2023/0098528 A1 | 3/2023 | Alaettinoglu et al. | |
| 2024/0406110 A1* | 12/2024 | Defilippi | H04L 45/50 |

* cited by examiner

CONSTRAINED SHORTEST PATH FIRST PATH COMPUTATION FOR UNORDERED LIST OF INCLUDED INTERFACES

FIELD OF THE DISCLOSURE

The present disclosure relates generally to networking and computing. More particularly, the present disclosure relates to systems and methods for a Constrained Shortest Path First (CSPF) path computation for an unordered list of included interfaces.

BACKGROUND OF THE DISCLOSURE

In communication networks, such as packet networks using various different protocols, traffic engineering generally refers to techniques for dynamically analyzing, predicting, and regulating traffic flow in the network. Traffic-engineered (TE) paths gives a service provider (i.e., a network operator) control over how traffic flows are routed in the network. For example, the network can use Multi-protocol Label Switching (MPLS), Segment Routing (SR), Internet Protocol (IP), and the like. A service provider uses a Path Computation Engine (PCE) to compute traffic-engineered paths considering different metrics for optimization such as, e.g., a shortest Interior Gateway Protocol (IGP) metric, lowest number of hops, shortest TE metric, lowest delay, etc., and different constraints such as, e.g., explicit inclusion or exclusion of nodes or links/interfaces, network resource diversity from other paths, link affinity, bandwidth guarantee along the path, etc.

BRIEF SUMMARY OF THE DISCLOSURE

The present disclosure relates to systems and methods for a Constrained Shortest Path First (CSPF) path computation for an unordered list of included interfaces. The approach for computing paths is CSPF which is an extension to shortest path algorithms where the path is computed to find the shortest path based on the different metrics while also fulfilling the different constraints. The present disclosure relates to so-called inclusion constraints where the constraints include an unordered list of included interfaces. In particular, in a network, a set of interfaces defines a link in the network, i.e., port 1 at node 1 connects to port 2 at node 2. We can define this as a set of interfaces or as a given link, i.e., either defines the particular part of the network. As an inclusion constraint, a path is requested that includes a given set of interfaces, i.e., the associated link. Further, as an unordered list, the inclusion constraint means the given set of interfaces, i.e., the associated link, can appear anywhere in the path, i.e., unordered. This is a difficult computation problem, especially as the size of a network scales and the number of included interfaces increases.

To that end, existing techniques prefer heuristics which provide some solution that is based on assumptions that make the computation less complex, but which do not necessarily yield the best solution. A brute-force approach can compute all possibilities, providing the best solution. However, preferring brute-force approach over the heuristics requires more processing while computing the path with the unordered list of include interfaces constraints. With a brute-force approach, the number of path combinations to be computed increases with the number of interfaces to be included, making it more complex with each interface added in the include constraints. In operation, this solution is not preferred by the PCEs where the speed is prioritized over accuracy.

However, using heuristics gives a non-optimal solution. So instead of going for any heuristics to minimize on the path combinations to be computed, the present disclosure includes a brute-force approach with optimizations to limit the complexity. With the brute-force approach, we compute the paths for all the possible path combinations to come up with the best possible path. The optimizations include reusing already computed paths, rejecting suboptimal paths along the way, and rejecting downstream paths. With this approach, we would still get the best possible solution while we would have saved on the processing required.

In various embodiments, the present disclosure includes a method with steps, an apparatus, processing device, cloud service, etc. configured to implement the steps, and a non-transitory computer-readable medium storing instructions that, when executed, cause one or more processors to implement the steps. The steps include receiving a request for a shortest path in a network from a source to a destination, based on a metric and with one or more constraints including a list of interfaces that should be included in the path, in any order; determining all possible path combinations between the source, the list of interfaces, and the destination, where each of the possible path combinations includes a plurality of sub-paths stitched together to form an end-to-end path between the source and the destination; for each of the possible path combinations, determining an end-to-end path from the source to the destination based on (1) utilizing an already computed sub-path if available, (2) computing a sub-path if it has not been computed yet and storing a result for re-use, and (3) rejecting a possible path combination based on one or more criteria; and responding to the request with a shortest path of all of the possible path combinations based on the metric.

The one or more criteria can include comparing a current value of the metric on a path of the possible path combinations being determined versus a final value of the metric from an already determined end-to-end path, the final value being a current best value, and stopping the determining of the path based on a comparison between the current value and the final value. The one or more criteria can include stopping the determining on a path of the possible path combinations being determined if it includes a non-viable sub-path of the plurality of sub-paths. The all possible path combinations can include every possible path from the source to the destination with the intermediate locations arranged to account for all possible orders of the list of interfaces. The steps can further include prior to the determining, excluding any of the possible path combinations that include non-viable sub-paths where there is no connectivity in the network. The metric can be one of an Interior Gateway Protocol (IGP) metric, a number of hops, a Traffic Engineering (TR) metric, and delay. The one or more constraints can include one or more of exclusion of a second list of interfaces, diversity, link affinity, and bandwidth. The network can utilize one of Multiprotocol Label Switching (MPLS), Segment Routing (SR), and Internet Protocol (IP).

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for a Constrained Shortest Path First (CSPF) path computation for an unordered list of included interfaces. The CSPF path computation uses a brute-force approach meaning we evaluate all possibilities to obtain the best possible solution, i.e., best path that meets the metrics and fulfills the constraints with a particular constraint including an unordered list of included interfaces. To overcome the processing complexity, we provide optimizations that make the brute-force approach comparable to heuristics in terms of efficiency.

Network

Figure 1:
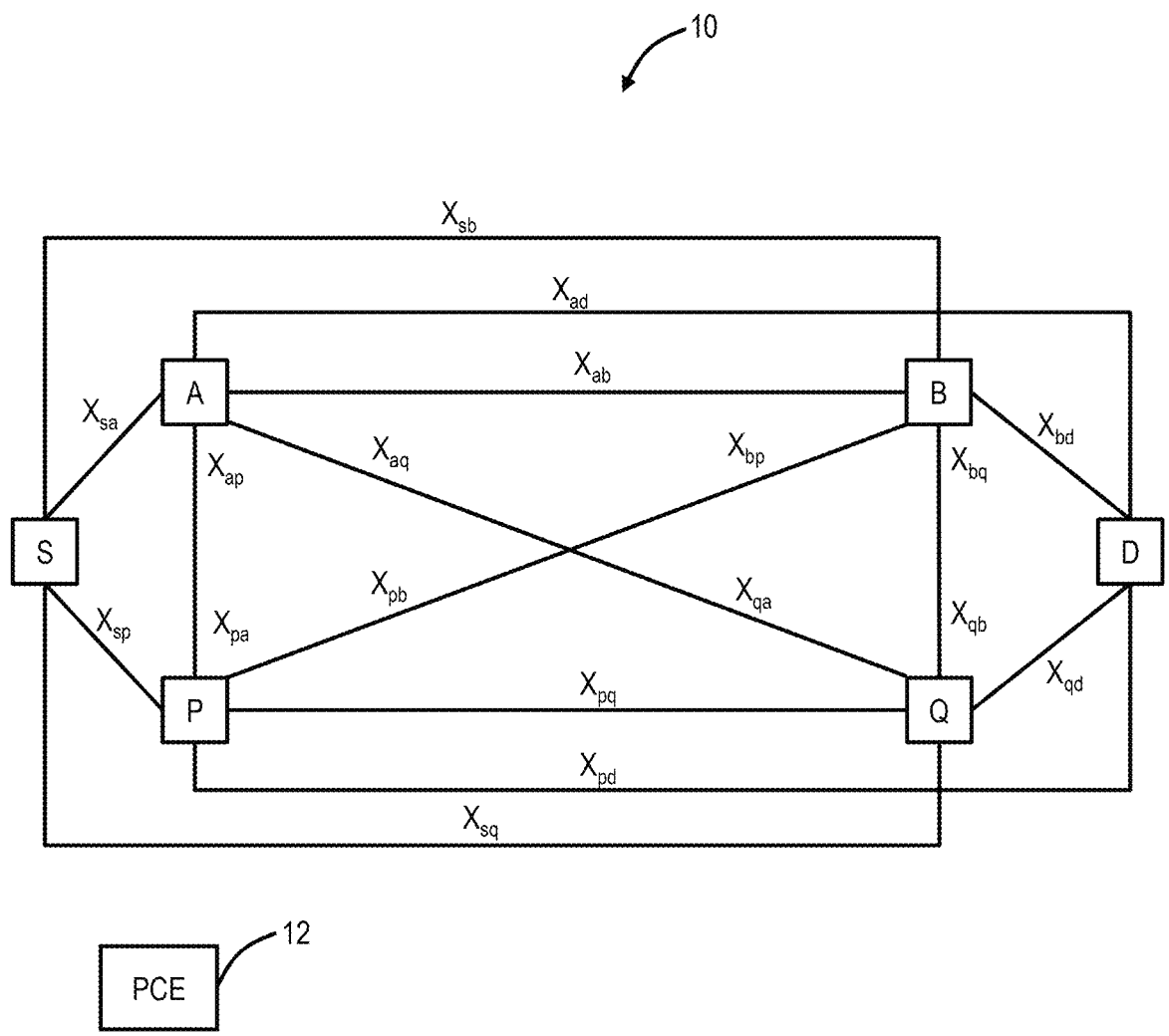
FIG. 1 is a network diagram of a network for illustrating path computation using CSPF with a constraint including an unordered list of included interfaces.

FIG. 1 is a network diagram of a network 10 for illustrating path computation using CSPF with a constraint including an unordered list of included interfaces. The network 10 includes nodes S, A, B, P, Q, D. Each node is a network element with one or more ports or interfaces, i.e., either logical or physical. The term included interfaces refers to a link between two nodes, defining two ports or interfaces that must be included in any path, whereas the term interface refers to the same concept as a port on the node or network element. The network 10 includes links between each of the nodes S, A, B, P, Q, D which can be referred to as a link or included interfaces, e.g., where NM represent each endpoint of a given link, e.g., link SA is between the nodes S, A and associated ports. Again, we can refer to a list of included interfaces to be the link NM or sub-path NM. That is, we will use the term included interfaces, and this includes the link NM. As this is a data network, those skilled in the art will recognize connectivity can be via any interface to any other interface, i.e., it does not have to be direct. For a simple example, the nodes S, A can be directly connected, as well as reachable via other interfaces. Also, each link NM has an associated link metric or sub-path metric labeled $X_{NM}$, where link metric $X_{SA}$ is the link metric for the sub-path SA. The network elements or nodes in the network 10 can be switches, routers, etc. The network 10 can include various logical layers, e.g., optical (Layer 0), Time Division Multiplexing (TDM) (Layer 1), Packet (e.g., Ethernet, Multiprotocol Label Switching (MPLS), Segment Routing, etc.) (Layer 2), Internet Protocol (IP) (Layer 3), and the like. In general, the path computation techniques described herein relate to packet level TE paths, e.g., MPLS, Segment Routing, IP, etc.

PCE

There can also be a Path Computation Engine (PCE) 12 communicatively coupled to the network 10. The PCE 12 is a processing device that can support path computation, in addition to other functions. The official definition of a PCE is an entity (component, application, or network node) that is capable of computing a network path or route based on a network graph and applying computational constraints. Note, the PCE 12 can be a server, a cloud service, an application, a management system, a controller, etc. For example, the PCE 12 can be a standalone device. In another example, the PCE 12 can be included with a Network Management System (NMS), Software Defined Networking (SDN) controller, network orchestrator, a component in a network element, or the like. Those skilled in the art will recognize the techniques for path computation described herein contemplate operation anywhere and the PCE 12 is shown for illustration purposes only. Also, those skilled in the art will recognize the network 10 is a simple network for ease of illustration. That is, practical embodiments of a network can include thousands of interfaces or more.

The PCE 12 uses CSPF to find the shortest metric path that satisfies the given constraints. While there are different constraints to evaluate as a part of CSPF, our focus here is specifically on the constraint where inclusion of the specific links/interfaces is desired.

Processing Include Interface Constraints

When we want to include certain interfaces as a part of the computed TE paths, we can break the end-to-end path computation into multiple pieces, where each piece would include one of the given links/interfaces to be included. These different pieces can then be stitched together to form an end-to-end path where all the input interfaces would have been included.

For example, for a path to be computed from S to D where the interfaces $i_1$, $i_2$ and $i_3$ are to be included, we can break the path computation from S to D into multiple path computation pieces as S→$i_1$, $i_1$→$i_2$, $i_2$→$i_3$ and $i_3$→D. Computation of each of these pieces can be treated as separate path computations which uses the rest of the resource constraints. This is a straightforward solution when we consider that the given interfaces are to be included in the specific order ($i_1$, $i_2$, $i_3$), but many a times the service provider just knows about the specific links/interfaces that have to be visited but are not sure about the order in which they need to be visited to get the path with optimum metric value. In such a case, the above-mentioned solution does not work as-is as it expects ordering for the interfaces to be included in the input.

Processing Unordered List of Include Interfaces Constraints

The PCE 12 can use heuristics here to decide on specific ordering of the links/interfaces and then use the above-mentioned solution to compute the end-to-end path, but the path computed this way would be a sub-optimal path and may not be the best possible path. To be able to compute the best possible path with the given unordered list of links/interfaces to be included, we propose a solution where we use a brute-force approach combined with some optimizations to come up with the best possible path when the ordering of the links/interfaces to be included is not known.

The following describes an example to illustrate the brute-force approach combined with optimizations presented herein, with reference to the network 10. For ease of illustration, we are computing a path from the node S (source) to the node D (destination) where links AB and PQ have to be included in the computed path, but the order in which these links have to be visited is not specified (i.e., an unordered inclusion).

In this solution, we first compute all the possible path combinations/orders for the given unordered list of interfaces and then we compute the end-to-end paths for each of these combinations one by one using the above-mentioned solution for the ordered list of interfaces as include constraints. While doing so, we use some information captured from the previous path computation to minimize the further computations, i.e., to both speed up future computations by reusing already computed paths and to reduce future computations by rejecting some paths.

As the order in which the links AB, PQ are to be visited is not specified as an input constraint, there are multiple path combinations that will need to be evaluated to be able to come up with best metric path or the shortest path. The shortest path may visit the links in any sequence and directions.

AB→PQ, AB→QP, BA→PQ, BA→QP, PQ→AB,
PQ→BA, QP→AB, QP→BA.

To be able to find the shortest path, we need to compare the path metric for all such combinations of the links. The following table lists the metrics for all possible sub-paths in the network 10, for end-to-end paths to be computed from S to D, while including link AB and PQ.

TABLE 1

$X_{sa}$, $X_{sb}$, $X_{sp}$, $X_{sq}$ are the metrics for sub-paths between source node S and intermediate nodes A, B, P, Q, respectively.
$X_{ad}$, $X_{bd}$, $X_{pd}$, $X_{qd}$ are the metrics for sub-paths between intermediate nodes A, B, P, Q and the destination node D, respectively.
$X_{ab}$ and $X_{ba}$ are link metrics for the link between A and B, in each direction.
$X_{pq}$ and $X_{qp}$ are link metrics for the link between P and Q, in each direction.
$X_{ap}$, $X_{pa}$ are the metrics for sub-paths between A and P, in each direction.
$X_{aq}$, $X_{qa}$ are the metrics for sub-paths between A and Q, in each direction.
$X_{bp}$, $X_{pb}$ are the metrics for sub-paths between B and P, in each direction.
$X_{bq}$, $X_{qb}$ are the metrics for sub-paths between B and Q, in each direction $X_{ab}$, $X_{ba}$, $X_{pq}$ and $X_{qp}$ are the link metrics we need to consider for path computation between nodes S and D. $X_{sa}$, $X_{sb}$, $X_{sp}$, $X_{sq}$, $X_{ad}$, $X_{bd}$, $X_{pd}$, $X_{qd}$, $X_{ap}$, $X_{pa}$, $X_{aq}$, $X_{qa}$, $X_{bp}$, $X_{pb}$, $X_{bq}$, $X_{qb}$ are the sub-path metrics we need to consider in single direction from the node S to the node D. $X_{aq}$ and $X_{qa}$ are the sub-path metrics between the node A and the node Q in two different directions. These can be different because the path taken to reach the node Q from the node A can be different from the path taken to reach the node A from the node Q. $X_{bp}$ and $X_{pb}$ are the sub-path metrics between the node B and the node P in two different directions. These can be different because the path taken to reach the node B from the node P can be different from the path taken to reach the node P from the node B.

Brute-Force Solution

A brute-force solution here will be to compute all the possible path combinations using the given set of links/interfaces and then compare the costs for all these paths computed to determine the best path. To do this, we need to compute all the possible orders in which these links/interfaces can be visited while computing a path from source to the destination and then compute paths for all such orders. For example, the brute-force solution for the above-mentioned example is to compute the paths for below hop combinations:

TABLE 2

1. S-A-B-P-Q-D
2. S-A-B-Q-P-D
3. S-B-A-P-Q-D
4. S-B-A-Q-P-D
5. S-P-Q-A-B-D
6. S-P-Q-B-A-D
7. S-Q-P-A-B-D
8. S-Q-P-B-A-D

So, when there are 2 links AB, PQ given as include constraints, the number of path combinations to be tried before concluding on the optimal path would be eight, again in a simplified network as in FIG. 1. Here, if the number of links in the constraint increases, the number of paths to be computed will also increase. When there are three links given as include constraints, the number of path combinations to be tried before concluding on the optimal path would be 48. Six options to go from the node S to the first cable×four options to go from first cable to the 2nd cable× two options to go from the 2nd cable to 3rd cable).

Brute-Force with Optimizations

While we may have multiple path combinations to be computed for concluding on the optimal path, the present disclosure provides optimizations to reduce the number of computations required.

Building Reusable Components

In the previous sections, we discussed that for processing the include interface list for end-to-end path computation, we can break the end-to-end path computation into multiple pieces, where each piece would include one of the given links/interfaces to be included and then these different pieces can then be stitched together to form an end-to-end path. Let us call these computed and stitched pieces as sub-paths.

So, for a path to be computed from the node S to the node D where the interfaces $i_1$, $i_2$ and $i_3$ are to be included, we can have sub-paths (S→$i_1$), ($i_1$→$i_2$), ($i_2$→$i_3$) and ($i_3$→D) computed and then stitched together to have an end-to-end path.

With the brute-force approach, we have multiple such orders/combinations of include interfaces to consider and as the number of interfaces/links to be included increases, the number of path computations to be done also increases. It would be inefficient to perform these multiple end-to-end path computations, when we might have already computed the corresponding sub-paths.

As a part of our solution for computing constraint based shortest path with an unordered list of include interfaces, we propose storing these computed sub-paths (S→$i_1$), ($i_1$→$i_2$), ($i_2$→$i_3$) and ($i_3$→D) and related attributes, to be used during the following optimizations. Storing sub-path attributes such as the list of nodes or interfaces visited, the sub-path metric/cost and some additional information such as if there is a valid sub-path between the given end points, the sub-path has a loop in it, etc. along with the actual sub-path computed, can optimize processing additional set of related constraints.

Proposed Optimizations

The proposed optimizations use the above-mentioned re-usable components to reduce the number of computations required. For the following description, we will use the node S, D, and interfaces $i_1$, $i_2$, $i_3$, for illustration.

Re-Use Already Computed Paths

Computation of every end-to-end path combination can be viewed as a sequence of sub-path calculations between intermediate hops. The path computation for the different path combinations may need to compute the sub-paths between the same set of intermediate hops. As discussed earlier, we can store such sub-paths and their attributes as re-usable components. For a simple example to illustrate the re-use concept, say two such path combinations to be computed are:

(a) (S, $i_1$, $i_2$, $i_3$, D) whose sub-paths to be computed are (S→$i_1$), ($i_1$→$i_2$), ($i_2$→$i_3$) and ($i_3$→D)
(b) (S, $i_2$, $i_3$, $i_1$, D) whose sub-paths to be computed are (S→$i_2$), ($i_2$→$i_3$), ($i_3$→$i_1$) and ($i_1$→D)

In this simple example, we can see that the sub-path ($i_2$→$i_3$) need to be computed for both the path combinations. As we go on and consider all the path combinations to be computed, there will be multiple combinations where some of the related the sub-paths would have been computed earlier.

Thus, for a first optimization, we propose re-using these sub-paths computed earlier instead of computing them again. That is, we store already computed sub-paths and when they are needed again, use the stored versions rather than recomputing, so they can be stitched together with other sub-paths for an end-to-end path.

Also, if it was noticed in the earlier sub-path computations that there is no valid path between the given endpoints ($i_2 \rightarrow i_3$), the remaining sub-path computations can be avoided, i.e., an early exit on particular path.

Reject Sub-Optimal Paths

While computing the paths for all the combinations one by one, for each path combination, at each hop, we can keep comparing the current path cost to the previous computed path combination's costs, which is the best/shortest path, and reject the current path, if a lower cost path is already present. If a new optimal path is found, we can reject/ignore the previous path combinations. Here, only in the worst case, we will end up computing the S to D paths for all the path combinations.

In a simple example to illustrate the rejection of sub-optimal paths, let us consider that we have already computed a first path (S, $i_1$, $i_2$, $i_3$, D) and its cost is X, i.e., some value that is comparable to determine whether or not this path is the shortest path. Again, the shortest path is based on the metric and the constraints are used to allow or reject a particular path. Now, for the next path, e.g., (S, $i_2$, $i_3$, $i_1$, D) being computed, at the interface $i_3$, if the cost of the sub-path (S, $i_2$, $i_3$) computed is already greater than X, we can ignore computing the path further as it will always be greater than X. That is, metric costs are additive, so if the current sub-path has a cost greater than the cost of an already computed end-to-end path that meets the constraints, there is no reason to continue.

As the path (S, $i_1$, $i_2$, $i_3$, D) was previously computed, sub-paths (S→$i_1$), ($i_1$→$i_2$), ($i_2$→$i_3$) and ($i_3$→D)) would already have been computed and stored with their metric/cost. Hence, while computing the next path combination (S, $i_2$, $i_3$, $i_1$, D), we do not need to compute the metric for the sub-path ($i_2$→$i_3$) again, and we can use the previously computed metric/cost for this sub-path and add it to the previous sub-path costs for the current path combination.

Reject Downstream Paths

Once we know that certain path combination from source to the destination, having a certain sequence of hops via an intermediate node/link P, is non-optimal, or if the path itself is not available via intermediate node/link P, we can reject all the end-to-end path combinations which has the same sequence of hops from source to P.

This is achieved by combining the above two optimizations, for the above optimizations we consider that the end-to-end path computation will be done one hop at a time and hence we do not know in advance if the end-to-end path being computed have a certain sequence of hops via an intermediate node/link P, which is previously known to be non-optimal. For this optimization, we need to analyze the path hops even before computing the path, to know if there is a certain sequence of hops which is previously known to be non-optimal.

Process

Figure 2:
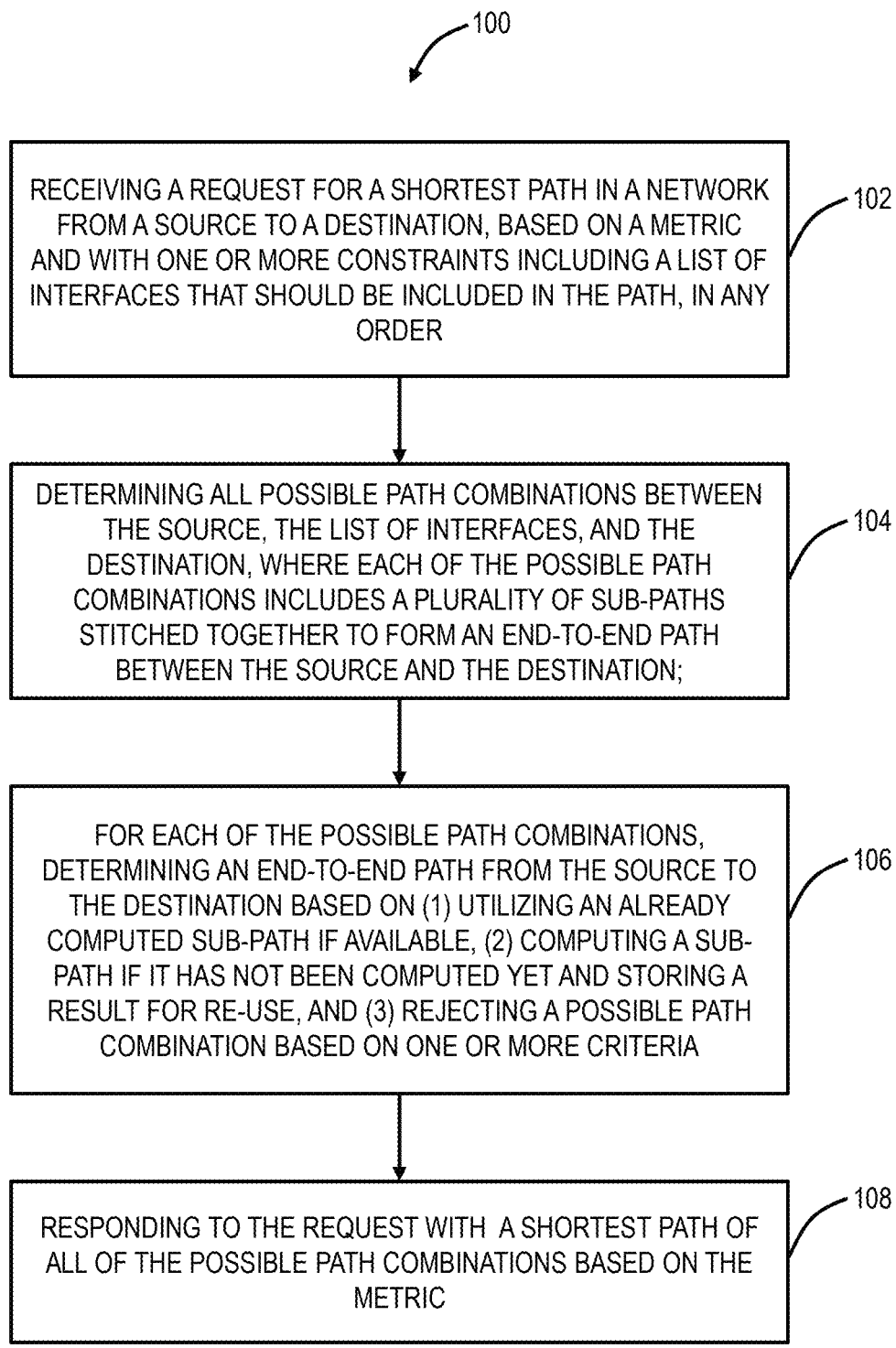
FIG. 2 is a flowchart of a process for Constrained Shortest Path First (CSPF) path computation for an unordered list of included interfaces.

FIG. 2 is a flowchart of a process 100 for Constrained Shortest Path First (CSPF) path computation for an unordered list of included interfaces. The process 100 contemplates implementation as a method having steps, via a processing device configured to implement the steps, and a non-transitory computer-readable medium storing instructions that, when executed, cause one or more processors to implement the steps. The process 100 provides a CSPF path computation to return a shortest path, based on one or more metrics, that also meets constraints including an unordered list of included interfaces. The path is in the network 10, or some other network, between two points, and the unordered list of included interfaces specifies links or interfaces that have to be included somewhere in the overall path. Again, performing a constraint-based path computation with the unordered list of include interfaces constraints requires more processing than what is required with the ordered list of include interfaces. The process 100 includes certain optimizations in combination with re-using previously computed information to save on such processing and make the path computation more efficient. The process 100 is a brute-force approach, meaning all paths are evaluated so the result will always be the best solution.

The process 100 includes receiving a request for a shortest path in a network from a source to a destination, based on a metric and with one or more constraints including a list of interfaces that should be included in the path, in any order (step 102); determining all possible path combinations between the source, the list of interfaces, and the destination, where each of the possible path combinations includes a plurality of sub-paths stitched together to form an end-to-end path between the source and the destination (step 104); for each of the possible path combinations, determining an end-to-end path from the source to the destination based on (1) utilizing an already computed sub-path if available, (2) computing a sub-path if it has not been computed yet and storing a result for re-use, and (3) rejecting a possible path combination based on one or more criteria (step 106); and responding to the request with a shortest path of all of the possible path combinations based on the metric (step 108).

The one or more criteria can include comparing a current value of the metric on a path of the possible path combinations being determined versus a final value of the metric from an already determined end-to-end path and stopping the determining of the path based on a comparison between the current value and the final value. The one or more criteria can include stopping the determining on a path of the possible path combinations being determined if it includes a non-viable sub-path of the plurality of sub-paths. The all possible path combinations can include every possible path from the source to the destination with the intermediate locations arranged to account for all possible orders of the list of interfaces. The process 100 can further include, prior to the determining, excluding any of the possible path combinations that include non-viable sub-paths where there is no connectivity in the network. The metric can be one of an Interior Gateway Protocol (IGP) metric, a number of hops, a Traffic Engineering (TR) metric, and delay. The one or more constraints can include one or more of exclusion of a second list of interfaces, diversity, link affinity, and bandwidth. The network can utilize one of Multiprotocol Label Switching (MPLS), Segment Routing (SR), and Internet Protocol (IP).

Example Processing Device

Figure 3:
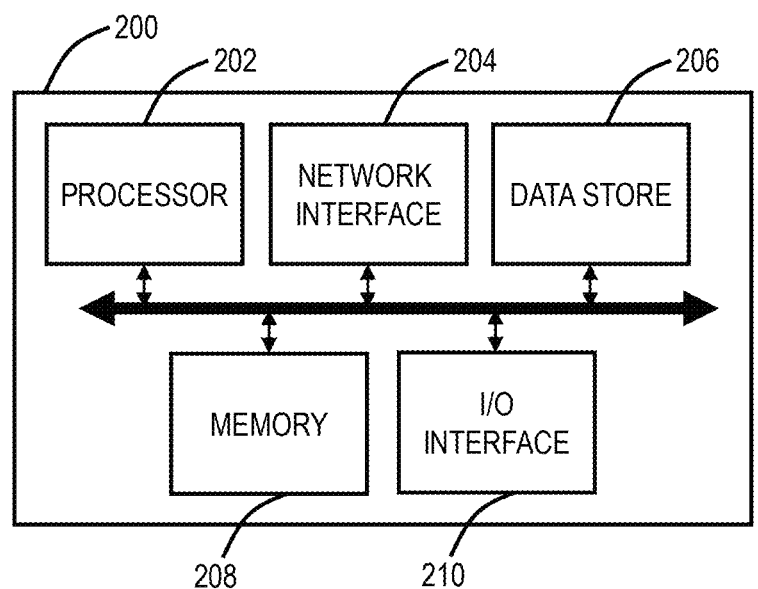
FIG. 3 is a block diagram of an example processing device, such as for the PCE in FIG. 1.

FIG. 3 is a block diagram of an example processing device 200, such as for the PCE 12. The processing device 200 can be part of a network element, or a stand-alone device communicatively coupled to the network element, such as the PCE 12, etc. Also, the processing device 200 can be referred to in implementations as a control module, a shelf controller, a shelf processor, a system controller, etc., in a network element. The processing device 200 can include a processor 202 which is a hardware device for executing software instructions. The processor 202 can be any custom made or commercially available processor, a central processing unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on a data communication network, such as to communicate to a management system, or the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof.

Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

Note, while the various descriptions relate to the processing device 200 and the PCE 12, those skilled in the art will appreciate a PCE can be located in an SDN controller, in-skin (within) a network element, hosted in the cloud, in a management system, and the like. Also, the present disclosure is not limited to being implemented in the PCE 12, rather any device can perform the various functions described herein.

Conclusion

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including software and/or firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," "a circuit configured to," "one or more circuits configured to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. A non-transitory computer-readable medium comprising instructions that, when executed, cause one or more processors to perform steps of:
    receiving a request for a shortest path in a network from a source to a destination, based on a metric and with one or more constraints including a list of interfaces that should be included in the shortest path, in any order;
    determining all possible path combinations between the source, the list of interfaces, and the destination, where each of the possible path combinations includes a plurality of sub-paths stitched together to form an end-to-end path between the source and the destination;
    for each of the possible path combinations, determining the end-to-end path from the source to the destination based on (1) utilizing an already computed sub-path if available, (2) computing a sub-path if it has not been computed yet and storing a result for re-use, and (3) rejecting a possible path combination based on one or more criteria; and responding to the request with a shortest path of all of the possible path combinations based on the metric.

2. The non-transitory computer-readable medium of claim 1, wherein the one or more criteria includes comparing a current value of the metric on a path of the possible path combinations being determined versus a final value of the metric from the already determined end-to-end path, the final value being a current best value, and stopping the determining of the path based on a comparison between the current value and the final value.

3. The non-transitory computer-readable medium of claim 1, wherein the one or more criteria includes stopping the determining on a path of the possible path combinations being determined if it includes a non-viable sub-path of the plurality of sub-paths.

4. The non-transitory computer-readable medium of claim 1, wherein the all possible path combinations include every possible path from the source to the destination with intermediate locations arranged to account for all possible orders of the list of interfaces.

5. The non-transitory computer-readable medium of claim 1, wherein the steps further include:
   prior to the determining of the end-to-end path, excluding any of the possible path combinations that include non-viable sub-paths where there is no connectivity in the network.

6. The non-transitory computer-readable medium of claim 1, wherein the metric is one of an Interior Gateway Protocol (IGP) metric, a number of hops, a Traffic Engineering (TR) metric, and delay.

7. The non-transitory computer-readable medium of claim 1, wherein the one or more constraints include one or more of exclusion of a second list of interfaces, diversity, link affinity, and bandwidth.

8. The non-transitory computer-readable medium of claim 1, wherein the network utilizes one of Multiprotocol Label Switching (MPLS), Segment Routing (SR), and Internet Protocol (IP).

9. A method comprising steps of:
   receiving a request for a shortest path in a network from a source to a destination, based on a metric and with one or more constraints including a list of interfaces that should be included in the shortest path, in any order;
   determining all possible path combinations between the source, the list of interfaces, and the destination, where each of the possible path combinations includes a plurality of sub-paths stitched together to form an end-to-end path between the source and the destination;
   for each of the possible path combinations, determining the end-to-end path from the source to the destination based on (1) utilizing an already computed sub-path if available, (2) computing a sub-path if it has not been computed yet and storing a result for re-use, and (3) rejecting a possible path combination based on one or more criteria; and
   responding to the request with a shortest path of all of the possible path combinations based on the metric.

10. The method of claim 9, wherein the one or more criteria includes comparing a current value of the metric on a path of the possible path combinations being determined versus a final value of the metric from the already determined end-to-end path, the final value being a current best value, and stopping the determining of the path based on a comparison between the current value and the final value.

11. The method of claim 9, wherein the one or more criteria includes stopping the determining on a path of the possible path combinations being determined if it includes a non-viable sub-path of the plurality of sub-paths.

12. The method of claim 9, wherein the all possible path combinations include every possible path from the source to the destination with intermediate locations arranged to account for all possible orders of the list of interfaces.

13. The method of claim 9, wherein the steps further include:
   prior to the determining of the end-to-end path, excluding any of the possible path combinations that include non-viable sub-paths where there is no connectivity in the network.

14. The method of claim 9, wherein the metric is one of an Interior Gateway Protocol (IGP) metric, a number of hops, a Traffic Engineering (TR) metric, and delay.

15. The method of claim 9, wherein the one or more constraints include one or more of exclusion of a second list of interfaces, diversity, link affinity, and bandwidth.

16. The method of claim 9, wherein the network utilizes one of Multiprotocol Label Switching (MPLS), Segment Routing (SR), and Internet Protocol (IP).

17. A processing device comprising:
   one or more processors; and
   memory storing instructions that, when executed, cause the one or more processors to:
      receive a request for a shortest path in a network from a source to a destination, based on a metric and with one or more constraints including a list of interfaces that should be included in the shortest path, in any order;
      determine all possible path combinations between the source, the list of interfaces, and the destination, where each of the possible path combinations includes a plurality of sub-paths stitched together to form an end-to-end path between the source and the destination;
      for each of the possible path combinations, determine the end-to-end path from the source to the destination based on (1) utilizing an already computed sub-path if available, (2) computing a sub-path if it has not been computed yet and storing a result for re-use, and (3) rejecting a possible path combination based on one or more criteria; and
      respond to the request with a shortest path of all of the possible path combinations based on the metric.

18. The processing device of claim 17, wherein the one or more criteria includes comparing a current value of the metric on a path of the possible path combinations being determined versus a final value of the metric from the already determined end-to-end path, the final value being a current best value, and stopping the determining of the path based on a comparison between the current value and the final value.

19. The processing device of claim 17, wherein the one or more criteria includes stopping the determining on a path of the possible path combinations being determined if it includes a non-viable sub-path of the plurality of sub-paths.

20. The processing device of claim 17, wherein the all possible path combinations include every possible path from the source to the destination with intermediate locations arranged to account for all possible orders of the list of interfaces.

* * * * *